Nov. 21, 1950 J. L. GILSON 2,531,210
FOOD FREEZING APPARATUS
Filed July 8, 1948 5 Sheets-Sheet 1

INVENTOR.
Joseph L. Gilson
BY
Popp and Popp
Attorneys.

Nov. 21, 1950  J. L. GILSON  2,531,210
FOOD FREEZING APPARATUS
Filed July 8, 1948  5 Sheets-Sheet 3

INVENTOR.
Joseph L. Gilson
BY Popp and Popp
Attorneys.

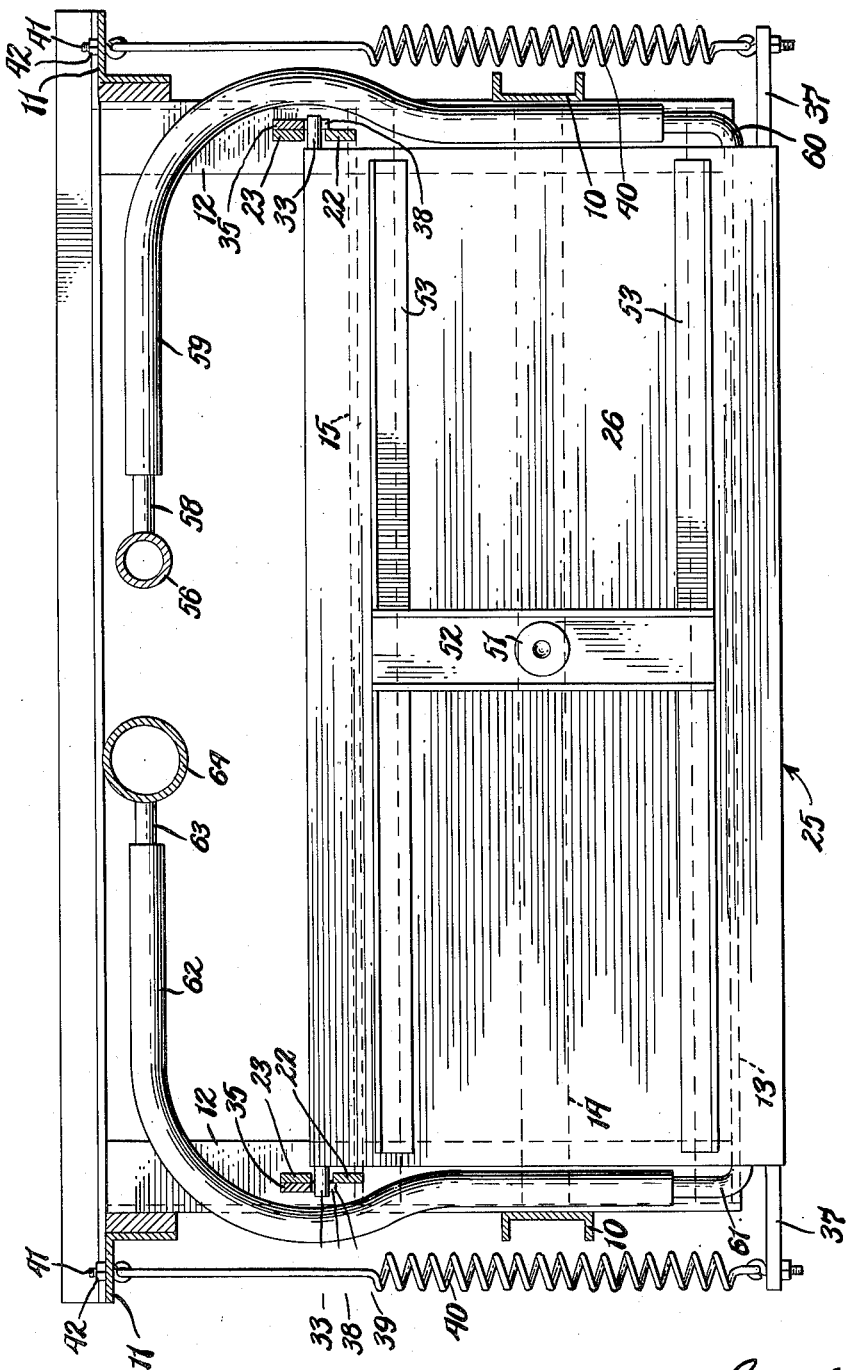

Nov. 21, 1950 J. L. GILSON 2,531,210
FOOD FREEZING APPARATUS
Filed July 8, 1948 5 Sheets-Sheet 5
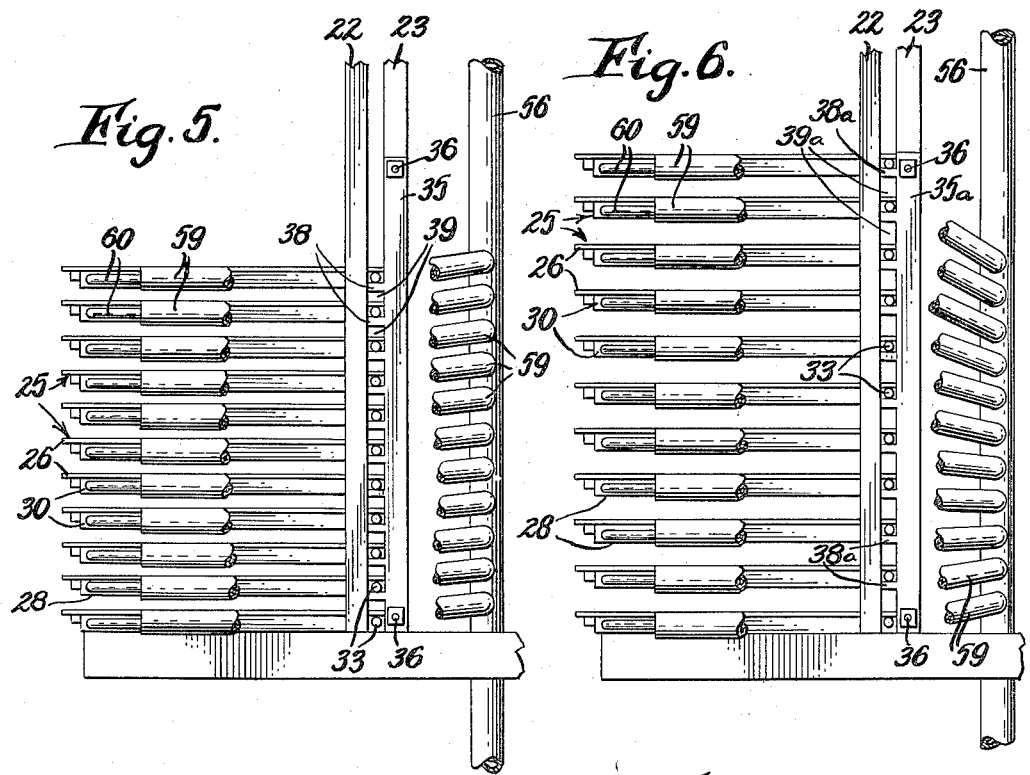
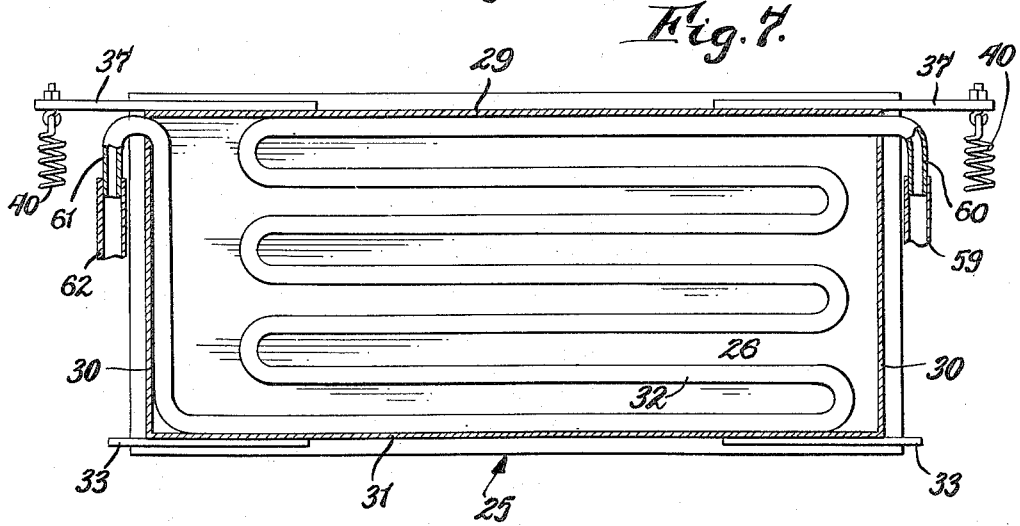
INVENTOR.
Joseph L. Gilson
BY Popp and Popp
Attorneys.

Patented Nov. 21, 1950

2,531,210

UNITED STATES PATENT OFFICE 2,531,210

FOOD FREEZING APPARATUS

Joseph L. Gilson, Hartsdale, N. Y.

Application July 8, 1948, Serial No. 37,589

14 Claims. (Cl. 62—114)

This invention relates to freezing apparatus and more particularly to such apparatus in which foods, usually in packages, are rapidly frozen between surfaces or plates maintained at a temperature substantially lower than the freezing point of the foods and between which the packages are compressed while the foodstuffs are being frozen.

One of the principal objects of the present invention is to provide such a plate freezer which can be rapidly loaded with the packages of food to be frozen and from which the frozen foods can be rapidly unloaded.

Another object is to provide such a plate freezer which is extremely low in cost and in particular avoids the necessity for the use of hydraulic lifts or other power operated mechanisms for moving the freezing plates or surfaces or for providing the necessary contact pressures between the plates and the packages of foodstuffs.

Another object is to provide a freezer including a stack of plates between which the packages of foodstuffs are frozen and in which the plates automatically space themselves to compensate for normal variation in the thickness of the packages being frozen.

Another object is to provide such a plate freezer which can be loaded and unloaded with little effort or skill on the part of the operator.

Another object is to provide such a multi-plate freezer which can be arranged, without insulating enclosure, directly in the freezer room, thereby saving the cost of such enclosure as well as rendering the equipment more accessible for loading, unloading and servicing. With the freezing unit placed directly in a freezing temperature room there is no excessive formation of frost upon the freezing plates which is a disadvantage of present multi-plate freezers located in a warm room.

Another object is to provide such a multi-plate freezing unit in which the packages can be placed directly in position on the plates thereby to avoid the necessity of preassembling the packages on trays which are slid between the plates as is now common practice.

Another object is to provide such a multi-plate freezer in which all of the plates are at a convenient level for direct loading so that the operator does not have to stoop to place the packages between the lowermost pair of plates nor do any uncomfortably high reaching to place the packages between the highest pair of plates.

Another object is to provide such a multi-plate freezer in which at no time is the entire load of plates lifted and wherein the lifting is by hand, one plate at a time, when the plates are empty. This particularly adapts the invention for small capacity units in locker plants or combined local locker and freezing establishments since the cost of hydraulic equipment and insulated enclosures now used is substantially the same for all sizes of units and hence renders the cost of small capacity units excessive. Units embodying the invention can advantageously be used in multiple with suitable conveyers in larger operations with the advantage of the low initial cost of the equipment combined with high operating efficiency.

Another object is, by the elimination of mechanical or machine operated controls, to eliminate the expense and delays in servicing such more complicated equipment.

Other objects and advantages of the invention will be apparent from the following description and drawings in which:

Fig. 4 is an enlarged horizontal section taken on line 4—4, Fig. 1.

Fig. 5 is a fragmentary vertical section taken on line 5—5, Fig. 2.

Fig. 6 is a view similar to Fig. 5 but with the substitution of another size of hinge bar to adapt the freezer to thicker packages of foodstuffs.

Fig. 7 is a horizontal section through one of the freezer plates, looking upwardly.

Figure 1:
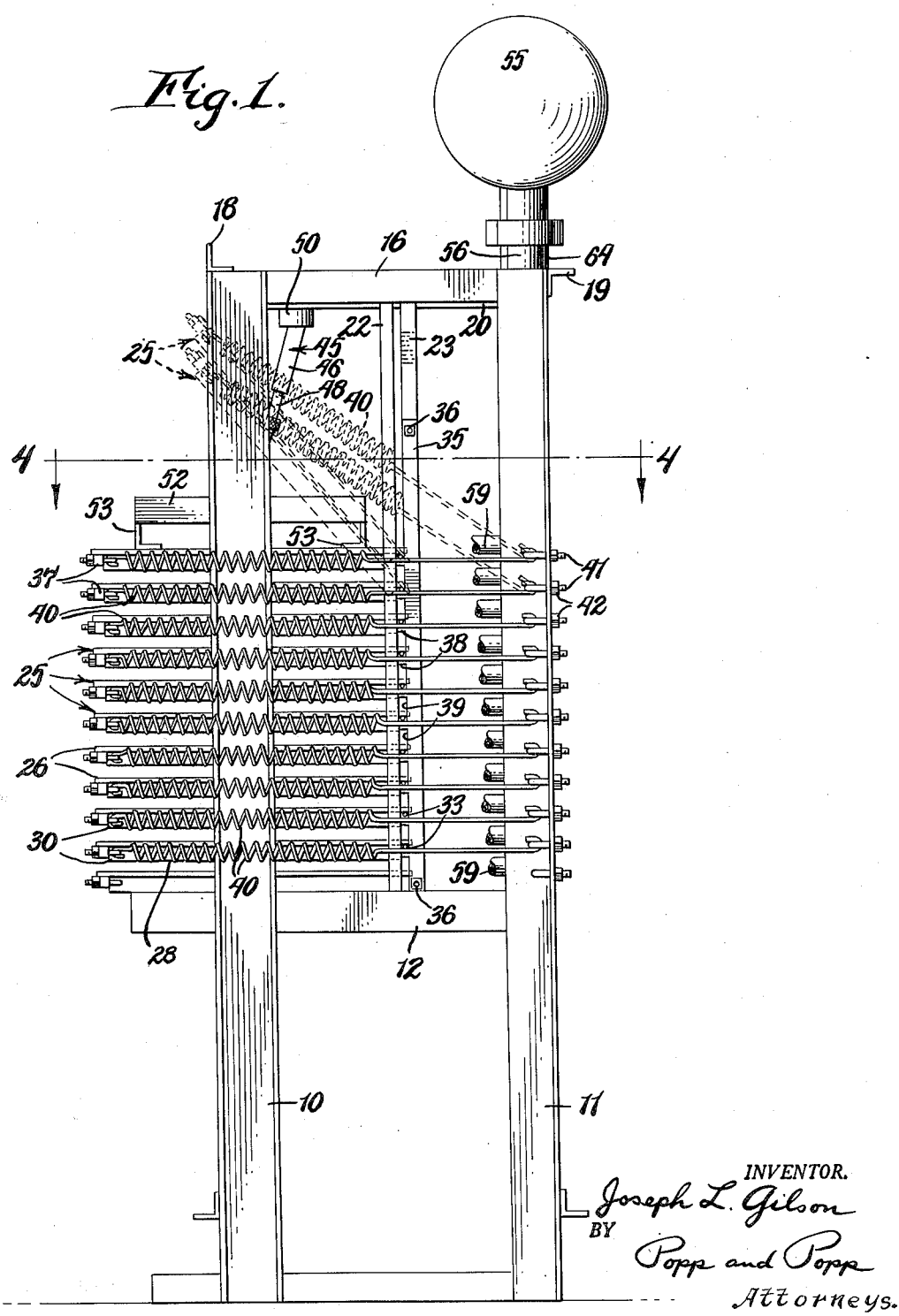
Fig. 1 is a side elevational view of a multi-plate freezer embodying the present invention.
Figure 2:
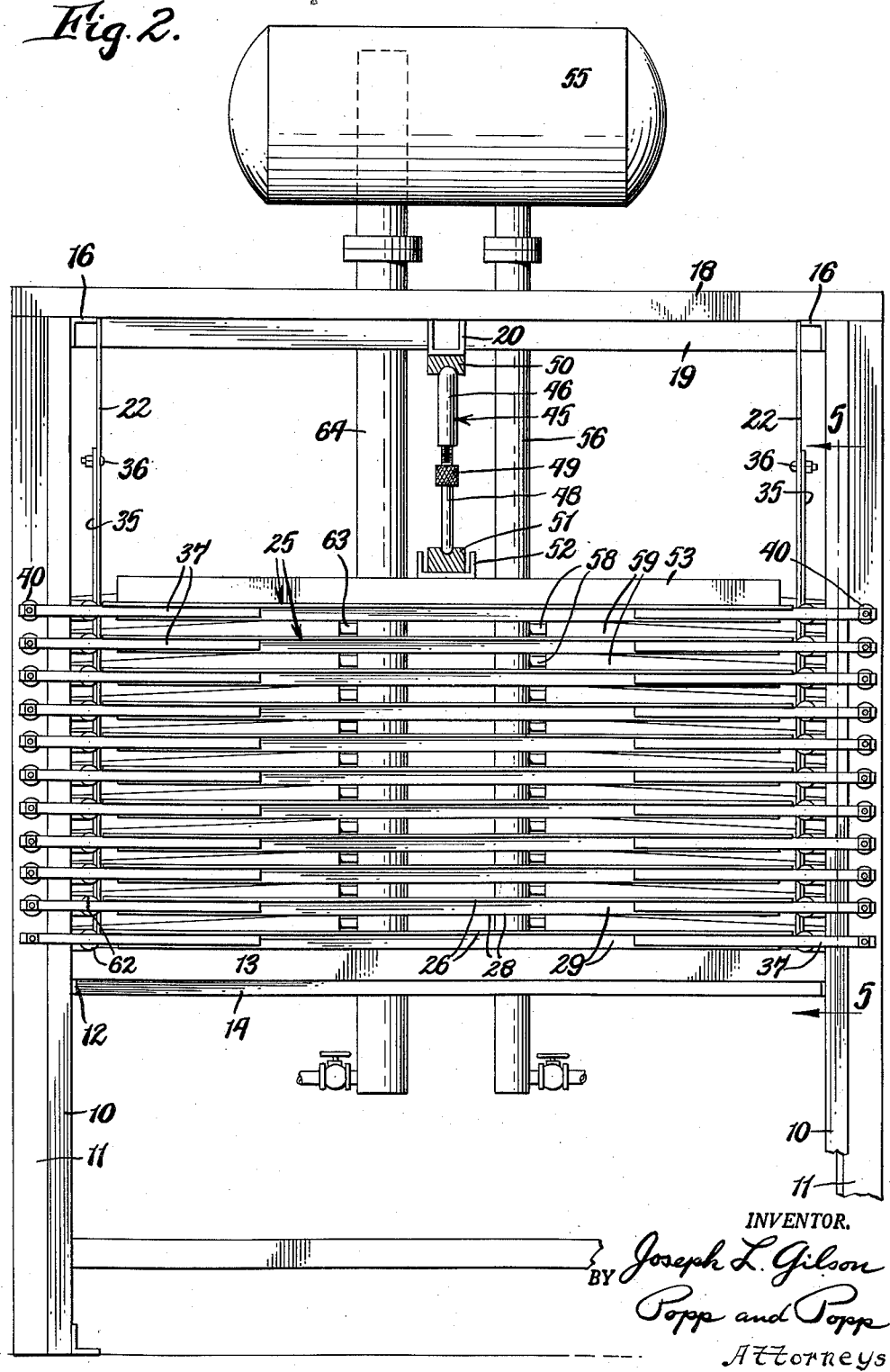
Fig. 2 is a front elevational view thereof, the sockets for the holddown strut being shown in section.
Figure 3:
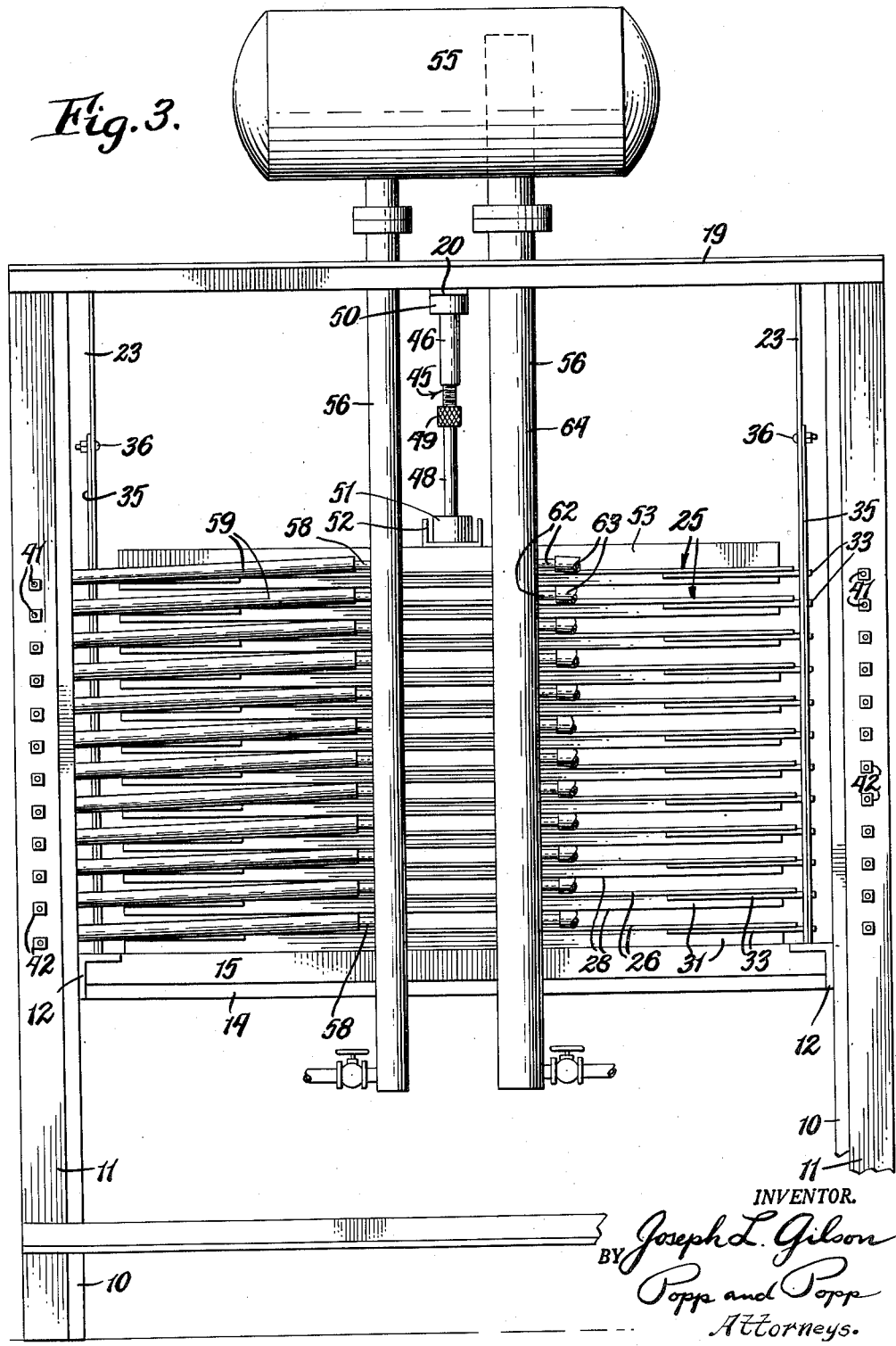
Fig. 3 is a rear elevational view thereof.

The freezer is shown as having a structural steel frame made of channel and angle bars and including front and rear side posts 10, 11 in the form of channel and angle bars, respectively; an elevated bed composed of side angle bars 12 which extend fore-and-aft and are carried by the side posts 10, 11 and which carry cross bars 13, 14 and 15; and a top frame comprising side bars 16 which extend fore-and-aft and are carried by the side posts 10, 11 and cross angle bars 18, 19. In addition, the top frame composed of the bars 16, 18 and 19 has a central channel 20 which extends fore-and-aft between the cross bars 18, 19 and serves to support the upper end of an extensible holddown strut as hereinafter described. Also, in addition, the pair of upper and lower fore-and-aft bars 16 and 12 at each side of the frame is connected by a pair of spaced vertical bars 22 and 23 which coact as pivot mountings for the series of freezer plates as hereinafter described.

Each of these freezer plates, indicated generally at 25, is of rectangular hollow form and has a rectangular top plate 26 and a rectangular bottom plate 28 held in vertically spaced relation to each other by a front wall 29, side walls 30 and rear wall 31 welded thereto to form a closed, rectangular chamber containing a serpentine coil 32 through which the freezing medium, such as ammonia or Freon is circulated. The serpentine tube 32 is in contact with the top and bottom of the plate 25 so as to provide, in effect, an extended surface on this coil. The upper plate 26 of each freezer plate is shown as extended beyond the walls, as best shown in Fig. 7, and a pair of pivot pins 33 are shown as welded to the rear face of the rear wall 31 of each plate and as extending horizontally outwardly from the opposite ends thereof. The projecting ends of these pivot pins are arranged to project through the spaces between the two pairs of vertical pivot mounting bars 22, 23, at opposite sides of the frame of the freezer. To support these pivot pins 33 between these pairs of vertical bars 22, 23, a hinge bar 35 is secured to each of the vertical frame bars 23, as best shown in Fig. 5. To mount these hinge bars 35 for ready detachment each of these hinge bars is preferably secured to the corresponding vertical frame bar by upper and lower bolts 36. Each of these hinge bars 35 is generally in the form of a comb or rake and has a plurality of forwardly projecting rectangular pivot supporting teeth or projections 38 which extend toward the corresponding vertical frame bar 22 and across the space between the corresponding vertical frame bars 22 and 23. It will be seen that the rectangular pivot supporting teeth 38 of each hinge bar 35 form, with the spaced vertical frame bars 22 and 23, a vertical series of rectangular spaces 39 at each side of the freezer and each of which receives and confines a corresponding pivot pin 33 of one of the freezer plates.

The freezer plates 25 are so pivotally secured to the frame in a vertical stack, each freezer plate projecting forwardly from its pivotal mounting and the lowermost freezer plate being arranged to be supported on the bed provided by the frame bars 12, 13, 14 and 15.

The packages of food to be frozen (not shown) are placed between the several freezer plates 25 of this stack, the packages of food on one freezer plate supporting the next higher freezer plate and being compressed between these two plates. These packages of food vary somewhat in thickness and to accommodate such variation the spaces 39 between the pivot supporting teeth or projections 38 of the hinge bars 35 are vertically elongated. With such vertical elongation of the spaces 39 it will be seen that if the packages supporting a freezer plate 25 are of greater height than the normal spacing of the pivots 33 on the teeth or projections 38 of the hinge bars 35, the freezer plate 25 supported on these packages will have its pivot pins 33 lifted from the corresponding pair of teeth or projections 38, and the freezer plate thereby adapting itself to the thicker packages. Since each freezer plate is supported on the packages therebelow, this freezer plate spreading effect of somewhat oversize packages can be cumulative and hence the vertical space 39 between the uppermost pair of teeth or projections 38 of each hinge bar 35 must be sufficient to accommodate the total oversize height of all of the layers of food packages between the several plates It is further desirable to be able to quickly adapt the freezer to packages of distinctly different thickness. To this end a series of pairs of hinge bars 35 having teeth or projections 38 of greater spacing are provided with each freezer. Thus, on referring to Fig. 6, it will be seen that the forward projections or teeth 38a of the hinge bar 35a are spaced further apart than the teeth 38 of the hinge bar 35 shown in Fig. 5. In consequence the use of the hinge bar 35a in lieu of the hinge bar 35 spaces the pivot points of the freezer plates 25 further apart to adapt the freezer to packages of greater thickness. It will be noted that with both the hinge bars 35 and 35a their bolt holes are spaced the same distance from their lower ends so that they can readily be interchanged by removing and replacing the bolts 36 to secure the selected hinge bar in place.

To facilitate the manual lifting of the successive freezer plates 25 about their pivot pins 33, a pair of bars 37 are welded to the front face of the front wall 29 of each freezer plate to project horizontally outwardly from the opposite ends of this front wall. To the end of each of these bars 37, with the exception of those of the lowermost or bottom plate 25 and which is not lifted, is suitably secured to the forward end of a helical tension spring 40. The rear end of each of these springs 40 is secured to the corresponding rear post 11 of the freezer frame. As shown, the rear ends of each spring 40 are formed to provide a hook extending through the eye of an eye bolt 41, the stem of this eye bolt extending through one flange of the corresponding rear frame post 11 and being held by a nut 42 so that the tension of the various springs 40 can be individually adjusted. These eye bolts 41 are so arranged that in the normal loaded condition of the freezer the springs 40 are disposed in a generally horizontal position and generally in line with the corresponding pivots 33.

The arrangement of the plates 25 and springs 40 is such, as shown, that when these plates are horizontal these springs are in a horizontal dead center position and hence these springs have no force component in a vertical direction so that the plates lie one above the other with the food packages therebetween as though no springs were present. When any plate 25 is lifted to tilt upwardly, its spring 40, although less tense than when in its horizontal dead center position, has a definite vertical force component which urges this plate upwardly and holds the plate in its upward position. Accordingly, each of the freezer plates 25, with the exception of the bottom freezer plate 25 which is not lifted, is elevated and held in an elevated position by its pair of springs 40 as it is raised beyond the dead center position of its springs.

With the freezer filled with packages of foodstuff to be frozen, it may be desirable to have the packages compressed by the freezer plates 25 to a degree greater than the weight of the plates and packages therebetween. To this end, and by way of an example of one means for accomplishing this purpose, an extensible strut 45 is shown as having an internally threaded sleeve 46 into which is screwed an externally threaded rod 48, this rod being provided with a knurled enlargement 49 to facilitate turning it. The upper extremity of the sleeve 46 is preferably closed and rounded to fit a socket 50 secured to the under side of the central fore-and-aft channel bar 20 of the head frame of the freezer. The lower end of the rod 48 is also rounded to fit a socket 51 on a fore-and-aft channel bar 52 connecting the central parts of two spaced angle bars 53 as best shown in Fig. 4. The H-shaped frame provided by the angle bars 53 and the central cross bar 52 engage the top plate 26 of the uppermost freezer plate and form a removable spreader frame which distributes the downward pressure of the extensible strut 45 over the upper face of the uppermost freezer plate 25. It will be understood that any conventional form of screw device, cam and lever device or hydraulic jack could be used in place of the specific extensible strut 45 shown.

As previously indicated, a refrigerant is circulated through the chambers 32 of the several freezer plates 25 so as to maintain them at a temperature sufficiently low to rapidly freeze the packages of foodstuffs interposed therebetween. While any refrigerating medium could be used, the freezer is shown as adapted for the use of ammonia which is evaporated in the chambers 32. To this end an overhead ammonia accumulator 55 is shown, from the bottom of which an outlet header 56 projects downwardly in rear of the freezer plates 25. This outlet header is provided with a vertically spaced series of nipples 58 corresponding in number to the number of freezer plates 25. Each of these nipples 58 is connected to a flexible ammonia pipe or conduit 59 which is arranged as best shown in Fig. 4, to extend along the corresponding side of its freezer plate 25. The other extremity of each flexible ammonia hose or conduit connects with a nipple 60 which, as best shown in Fig. 7, is secured to the corresponding end of the serpentine coil 32 in the companion freezer plate 25 and supplies the liquid ammonia thereto. The opposite end of this serpentine coil 32 is provided with an outlet nipple 61 connecting with a flexible hose or conduit 62 which is arranged alongside this freezer plate and extends to the rear thereof to connect with one of a series of nipples 63 on a vertical return header 64 connecting with the accumulator 55.

It will be seen that with the freezer, the normally horizontal freezer plates 25 are pivoted on the frame along their corresponding rear edges to swing about spaced, generally horizontal axes arranged in a generally vertical plane whereby the plates can be opened in the manner of a book, that is, the upper freezer plate of any pair of said freezer plates can be swung upwardly to part and can be swung downwardly to bring them into spaced parallel relation with each other and with the articles to be frozen interposed therebetween. The tension springs 40 secured to the free end of each freezer plate 25, with the exception of the stationary bottom freezer plate, are each secured to the frame at a point on the opposite side of the pivot axis of its freezer plate, and, in the generally horizontal position of its freezer plate, being generally horizontally disposed approximately in line with the said pivot axis so as to assist in raising the freezer plates and to hold them in an elevated, inoperative position.

With the freezer in operation, the packages of food are held between the several freezer plates 25 and through which a refrigerant, such as ammonia, is circulated. This ammonia is supplied from the accumulator 55 from which it flows through the vertical supply header 56, nipples 58, flexible horizontal conduits 59, and inlet nipples 60 to the serpentine coil 32 in the several freezer plates. The ammonia passes from the serpentine coil 32 through the outlet nipples 61 and flexible conduits 62 to the vertical return header 64 from which the ammonia returns to the accumulator 55. With the packages of food held under compression by the opposing surfaces of the several freezing plates 25, and with these plates maintained at a sufficiently low temperature by the refrigerant flowing therethrough, the food stuffs in the packages are rapidly frozen.

When the freezing operation is completed, the operator seizes the knurled enlargement 49 of the strut 45 and turns it so as to screw the threaded rod 48 up into the threaded sleeve 46. This contracts the extensible strut 45 and frees it from the upper and lower sockets 52. The operator then places the extensible strut to one side and can remove the removable spreader frame formed by the bars 52, 53 (Fig. 4) although this spreader frame can be secured to the uppermost freezer plate 25 if desired.

The operator then seizes the forward edge of the uppermost freezer plate 25 and lifts the same, this uppermost freezer plate swinging about its pivot pins 33. As this plate is lifted, its pair of helical tension springs 40 progressively become more effective and aid in lifting the freezer plate due to the more favorable angle which these springs assume as the freezer plate moves toward a vertical position. When the uppermost freezer plate 25 reaches the limit of its upward movement its pair of springs 40 holds the freezer plate in this elevated position. The operator can therefore rapidly remove the frozen packages held between the uppermost freezer plate 25 and the next succeeding lower freezer plate 25.

The operator then seizes this next succeeding lower freezer plate 25 and lifts it in the same manner as with the uppermost freezer plate, its pair of springs 40 serving to assist in such lifting to hold it in an elevated position against the underside of the elevated uppermost freezer plate 25, this condition of the parts being illustrated by dotted lines in Fig. 1.

The exposed layer of foodstuffs is then removed from the next lower freezer plate 25, and in succession each of the freezer plates is lifted to an elevated spring supported position after the layers of frozen foodstuffs have been removed therefrom.

When the layer of foodstuffs has been removed from the lowermost freezer plate 25, and which is shown as unprovided with springs 40 since it is never required to be elevated, the operator replaces the removed layer with a layer of unfrozen packages of foodstuffs to be processed. As soon as he has completed the layer he draws down the next higher freezer plate 25. In so doing the lowered freezer plate 25 and its pair of springs 40 are brought to an approximate horizontal position so that these springs are ineffective in counterbalancing the weight of the freezer plate and which hence rests upon the packages of foodstuffs to be frozen. If these packages are somewhat oversize, the lowered freezer plate 25 is able to adapt itself to such excess height. Thus, its pivot pins 33 are confined in the vertically elongated slots 39 jointly provided by the frame bars 22, 23 and the teeth or projections 38 of the hinge bar 35. Hence the pivot pins 33 are permitted to rise in the slots 39 when the packages are somewhat oversize. The operator then places another layer of packages of foodstuff to be frozen on the freezer plate 25 just lowered and draws down the next succeeding higher freezer plate 25. The alternate loading of the upper surface of each freezing plate with the packages of foodstuffs and the drawing down of the next succeeding higher freezer plate 25 is continued until the topmost freezer plate 25 is drawn down.

The operator then places the spreader frame composed of the bars 52, 53 upon the upper wall 26 of this uppermost freezer plate and picks up the extensible strut 45. The operator then fits one end of this strut in the socket 50 carried by the frame and its other end in the socket 51 carried by the spreader frame 52, 53 and turns the knurled enlargement 49 so as to increase the effective length of the threadedly connected rod and sleeve 48, 46. This causes the strut 45 to exert downward pressure on the spreader frame 52, 53, which pressure is transmitted to the uppermost freezer plate 25. This pressure is in turn transmitted through the several freezer plates 25 and through the several layers of packages of foodstuffs therebetween so as to provide the desired pressure to insure adequate thermal contact between the freezer plates 25 and the packages of foodstuffs interposed therebetween.

After a run of packages of a certain size it may be desired to freeze a run of packages of a different size. For this purpose the operator removes the bolts 36 and the hinge bars 35 from the frame bars 23. He then selects another pair of hinge bars, such as the hinge bars 35a, Fig. 6, having a different spacing of their teeth or projections 38a as compared with the removed hinge bars. These newly selected hinge bars 35a are then secured to the vertical frame bars 23 by the bolts 36, the pivot pins 33 of the several freezer plates being arranged to be supported by their teeth or projections 38a. In this manner the spacing of the freezer plates 25 is readjusted to suit the new size of package being processed, and the operation proceeds as before.

Because of the convenience and speed in loading and unloading the freezer forming the subject of the present invention, it can be used directly in a freezer room without requiring any insulated enclosure, thereby saving the cost of such enclosure and rendering the freezer more accessible for service and repairs. With the unit placed directly in a freezing temperature there is no great formation of frost upon the freezer plates as is the case with present plate type freezers located in a warm room. Further, it will be noted that the working surfaces of the freezer plates 25 are not exposed to the atmosphere when in their elevated inoperative position, thereby to further minimize the danger of frosting these surfaces.

Further, it will be seen that the freezer is very convenient for loading and unloading. The plates are all at a convenient level for operation and in a compact nested form and remain so at all times. The operator does not have to stoop to place packages on the lowermost freezer plate or to do any uncomfortably high reaching for the upper freezer plates. Further, there is no need to preassemble the packages on trays and slide them between the freezer plates. Hence the freezer permits the food being brought to and removed from the freezer directly by a conveyor.

It will further be seen that at no time is the entire load of food and plates lifted and that the only lifting is by hand, one freezer plate at a time, when the freezer plates are empty. No hydraulic lifting devices are therefore required and this permits of the construction of small capacity units with a small number of plates, with a corresponding reduction in cost, the cost being substantially proportional to the number of plates employed. With present plate type freezer units the cost of the enclosure and the hydraulic lifting equipment is the same, regardless of the number of plates of the freezer.

All mechanical or machine operated controls are eliminated and this eliminates the service and possible delays encountered with such equipment.

While the freezer embodying the present invention is particularly attractive to small freezing operations such as in locker plants or combined local locker and freezing establishments, these units can advantageously be set up in multiple in a freezer room with conveyors to and from them and operated upon a very efficient basis, with the advantage of very low initial cost of each unit.

I claim:

1. In a freezer, a frame, a row of freezer plates arranged in face to face spaced parallel relation and pivoted on said frame along corresponding edges of said freezer plates to swing about spaced parallel axes arranged in a plane extending along said row whereby any pair of the freezer plates can be swung apart and swung together into said spaced parallel relation and with the articles to be frozen interposed therebetween, a tension spring secured at one end to the free end of each of said freezer plates and at its opposite end to said frame at a point on the opposite side of the pivot axis thereof and in the operative position of said plate being generally in line with said pivot axis, and conduits arranged to supply a refrigerating medium to said freezer plates to maintain them at a freezing temperature.

2. In a freezer, a frame, a plurality of normally horizontally disposed freezer plates pivoted on said frame along corresponding edges of said freezer plates to swing about spaced, generally horizontal axes arranged in a generally vertical plane whereby any pair of the freezer plates can be swung vertically apart and can be swung vertically together to bring them into spaced parallel relation with each other and with the articles to be frozen interposed therebetween, a tension spring secured at one end to the free end of each of said freezer plates and at its opposite end to said frame at a point on the opposite side of the pivot axis thereof and, in the generally horizontal position of its freezer plate, being generally horizontally disposed approximately in line with said pivot axis, and conduits arranged to supply a refrigerating medium to said freezer plates to maintain them at a freezing temperature.

3. In a freezer, a frame, a stack of normally horizontally disposed freezer plates, a pivot pin and slot connection pivotally securing said freezer plates to said frame to swing about spaced, generally horizontal axes arranged along corresponding edges of said freezer plates and arranged in a generally vertical plane whereby any pair of the freezer plates can be swung vertically apart and can be swung vertically together to bring them into spaced parallel relation with each other and with the articles to be frozen interposed therebetween, the slots of said pivot pin and slot connections being vertically disposed to permit said plates to spread in accommodating articles of varying thicknesses while maintaining parallel relation with one another, and conduits arranged to supply a refrigerating medium to said freezer plates to maintain them at a freezing temperature.

4. In a freezer, a frame, a stack of normally horizontally disposed freezer plates, a pivot pin and slot connection pivotally securing said freezer plates to said frame to swing about spaced, generally horizontal axes arranged along corresponding edges of said freezer plates and arranged in a generally vertical plane whereby any pair of the freezer plates can be swung vertically apart and can be swung vertically together to bring them into spaced parallel relation with each other and with the articles to be frozen interposed therebetween, the slots of said pivot pin and slot connections being vertically disposed to permit said plates to spread in accommodating articles of varying thickness while maintaining parallel relation with one another, a tension spring secured at one end to the free end of each of said freezer plates and at its opposite end to said frame at a point on the opposite side of the pivot axis thereof and, in the generally horizontal position of its freezer plate, being generally horizontally disposed approximately in line with said pivot axis, and conduits arranged to supply a refrigerating medium to said freezer plates to maintain them at a freezing temperature.

5. In a freezer, a frame, a stack of normally horizontally disposed freezer plates, a generally horizontal pivot pin secured to each of said freezer plates, said pivot pins being arranged at corresponding edges of said freezer plates to permit said freezer plates to swing about spaced, generally horizontal axes arranged in a generally vertical plane, said frame including a vertical bar having a series of horizontally extending notches alongside said corresponding edges of said freezer plates and opening toward the free ends of said freezer plates and in each of which one of said pivot pins is arranged, whereby any pair of the freezer plates can be swung vertically apart and can be swung vertically together to bring them into spaced parallel relation with the articles to be frozen interposed therebetween, means arranged to retain said pivot pins in said notches, and conduits arranged to supply a refrigerating medium to said freezer plates to maintain them at a freezing temperature.

6. In a freezer, a frame, a stack of normally horizontally disposed freezer plates, a generally horizontal pivot pin secured to each of said freezer plates, said pivot pins being arranged at corresponding edges of said freezer plates to permit said freezer plates to swing about spaced, generally horizontal axes arranged in a generally vertical plane, said frame including a vertical bar having a series of horizontally extending notches alongside said corresponding edges of said freezer plates and opening toward the free ends of said freezer plates and in each of which one of said pivot pins is arranged, whereby any pair of the freezer plates can be swung vertically apart and can be swung vertically together to bring them into spaced parallel relation with the articles to be frozen interposed therebetween, said frame also including a vertical bar arranged along the open sides of said notches to retain said pivot pins therein, and conduits arranged to supply a refrigerating medium to said freezer plates to maintain them at a freezing temperature.

7. In a freezer, a frame, a stack of normally horizontally disposed freezer plates, a generally horizontal pivot pin secured to each of said freezer plates, said pivot pins being arranged at corresponding edges of said freezer plates to permit said freezer plates to swing about spaced, generally horizontal axes arranged in a generally vertical plane, said frame including a vertical bar having a series of horizontally extending notches alongside said corresponding edges of said freezer plates and opening toward the free ends of said freezer plates and in each of which one of said pivot pins is arranged, whereby any pair of the freezer plates can be swung vertically apart and can be swung vertically together to bring them into spaced parallel relation with the articles to be frozen interposed therebetween, a spring interposed between each of said freezer plates and said frame and, in the horizontal position of said freezer plates, biasing said freezer plates horizontally and said pivot pins into said notches to retain them therein, and conduits arranged to supply a refrigerating medium to said freezer plates to maintain them at a freezing temperature.

8. In a freezer, a frame, a stack of normally horizontally disposed freezer plates, a generally horizontal pivot pin secured to each of said freezer plates, said pivot pins being arranged at corresponding edges of said freezer plates to permit said freezer plates to swing about spaced, generally horizontal axes arranged in a generally vertical plane, a vertical bar removably secured to said frame and having a vertical series of teeth providing notches arranged alongside said corresponding edges of said freezer plates and opening toward the free ends of said freezer plates and in each of which one of said pivot pins is arranged, whereby any pair of the freezer plates can be swung vertically apart and can be swung vertically together to bring them into spaced parallel relation and with the articles to be frozen interposed therebetween, means arranged to retain said pivot pins in said notches, and conduits arranged to supply a refrigerating medium to said freezer plates to maintain them at a freezing temperature.

9. In a freezer, a frame including end post members connected by bed frame members and top frame members, a stack of normally horizontal freezer plates supported on said bed frame members below said top frame members and between said post members, means pivotally connecting the rear edges of freezer plates to said frame to swing about vertically spaced, generally horizontal axes arranged in a generally vertical plane whereby any pair of the freezer plates can be swung vertically apart and swung vertically together to bring them into spaced parallel relation with each other and with the articles to be frozen interposed therebetween, and conduits arranged to supply a refrigerating medium to said freezer plates to maintain them at a freezing temperature.

10. In a freezer, a frame including end post members connected by bed frame members and top frame members, a stack of normally horizontal freezer plates supported on said bed frame members below said top frame members and between said post members, means pivotally connecting the rear edges of freezer plates to said frame to swing about vertically spaced, generally horizontal axes arranged in a generally vertical plane whereby any pair of the freezer plates can be swung vertically apart and swung vertically together to bring them into spaced parallel relation with each other and with the articles to be frozen interposed therebetween, conduits arranged to supply a refrigerating medium to said freezer plates to maintain them at a freezing temperature, and an extensible member interposed between said frame and the uppermost of said freezer plates and arranged to exert a downward pressure on said stack of freezer plates when extended.

11. In a freezer, a frame including end post members connected by bed frame members and top frame members, a stack of normally horizontal freezer plates supported on said bed frame members below said top frame members and between said post members, means pivotally connecting the rear edges of freezer plates to said frame to swing about vertically spaced, generally horizontal axes arranged in a generally vertical plane whereby any pair of the freezer plates can be swung vertically apart and swung vertically together to bring them into spaced parallel relation with each other and with the articles to be frozen interposed therebetween, conduits arranged to supply a refrigerating medium to said freezer plates to maintain them at a freezing temperature, and an extensible strut interposed between said top frame and the uppermost of said freezer plates and arranged to exert a downward pressure on said stack of freezer plates when extended.

12. In a freezer, a frame including end post members connected by bed frame members and top frame members, a stack of normally horizontal freezer plates supported on said bed frame members below said top frame members and between said post members, means pivotally connecting the opposite sides of the rear ends of said freezer plates to the corresponding post members to swing about vertically spaced, generally horizontal axes arranged in a generally vertical plane whereby any pair of the freezer plates can be swung vertically apart and swung vertically together to bring them into spaced parallel relation with each other and with the articles to be frozen interposed therebetween, each of said pivotal connections including a pivot pin and a vertically elongated slot whereby the pivot axis of each of said freezer plates is free to move vertically a limited extent to permit said plates to adapt themselves to variations in the thickness of the articles being frozen, and conduits arranged to supply a refrigerating medium to said freezer plates to maintain them at a freezing temperature.

13. In a freezer, a frame including end post members connected by bed frame members and top frame members, a stack of normally horizontal freezer plates supported on said bed frame members below said top frame members and between said post members, means pivotally connecting the opposite sides of the rear ends of said freezer plates to the corresponding post members to swing about vertically spaced, generally horizontal axes arranged in a generally vertical plane whereby any pair of the freezer plates can be swung vertically apart and swung vertically together to bring them into spaced parallel relation with each other and with the articles to be frozen interposed therebetween, a pair of tension spring arranged along opposite sides of each freezer plate and each secured at one end to the free end of its freezer plate and at its opposite end to a corresponding side post member at a point on the side of the pivot axis of its freezer plate opposite the free end thereof and, in the generally horizontal position of its freezer plate, being generally horizontally disposed approximately in line with said pivot axis, and conduits arranged to supply a refrigerating medium to said freezer plates to maintain them at a freezing temperature.

14. In a freezer, a frame including end post members connected by bed frame members and top frame members, a stack of generally rectangular hollow freezer plates supported on said bed frame members below said top frame members and between said post members and with their rear edges arranged in a generally vertical plane, a pair of coaxial, horizontal pivot pins projecting outwardly from opposite sides of each of said freezer plates adjacent to and generally parallel with the said rear edges thereof, said end postmembers being provided with a vertical series of forwardly projecting notches each receiving one of said pivot pins and supporting said freezer plates to swing about vertically spaced generally horizontal axes arranged in a generally vertical plane whereby any pair of the freezer plates can be swung vertically apart and swung vertically together to bring them into horizontal and spaced, parallel relation with each other and with the articles to be frozen interposed therebetween, a pair of tension springs arranged along opposite sides of each freezer plate and each secured at one end to the free end of its freezer plate and at its opposite end to a corresponding side post member at a point on the side of the pivot axis of its freezer plate opposite the free end thereof, and, in the generally horizontal position of its freezer plate, being generally horizontally disposed approximately in line with said pivot axis, and conduits arranged to supply a refrigerating medium to said freezer plates to maintain them at a freezing temperature.

JOSEPH L. GILSON.

REFERENCES CITED

The following references are of record in the file of this patent:

UNITED STATES PATENTS

| Number | Name | Date |
| --- | --- | --- |
| 1,614,455 | Cooke | Jan. 18, 1927 |
| 2,040,947 | Mojonnier | May 19, 1936 |
| 2,455,867 | Kleist | Dec. 7, 1948 |